United States Patent Office 3,770,809
Patented Nov. 6, 1973

---

3,770,809
THIAMPHENICOL DERIVATIVES
Hisao Akiyama, Nishinomiya, and Toshiaki Komatsu and Toyozo Katsura, Takarazuka, Japan, assignors to Sumitomo Chemical Company, Limited, Higashi-ku, Osaka, Japan
No Drawing. Filed Feb. 17, 1971, Ser. No. 116,273
Claims priority, application Japan, Feb. 19, 1970, 45/14,584
Int. Cl. C07c *69/40*
U.S. Cl. 260—485 G  2 Claims

ABSTRACT OF THE DISCLOSURE

Thiamphenicol derivatives of the following formula

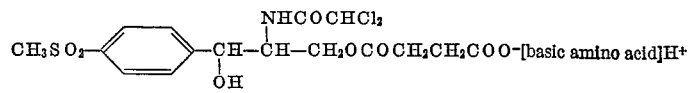

wherein basic amino acid represents arginine, lysine, ornithine, histidine or tryptophan have characteristics of excellent solubility and give a neutral aqueous solution and are of very low toxicity. They give neither topical irritations nor necrosis upon injection and exhibit high blood level and are excreted into urine to a great extent as an active form following injection.

---

The present invention relates to novel thiamphenicol derivatives and also to a method for producing the same.

More particularly, this invention relates to novel thiamphenicol derivatives of the following Formula I:

(I) 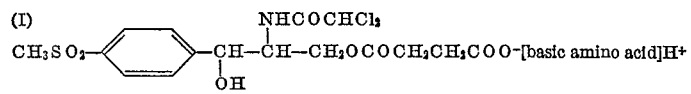

wherein "basic amino acid" represents arginine, lysine, ornithine, histidine or tryptophan. This invention also relates to a method for producing the novel water-soluble basic amino acid salts of thiamphenicol succinic acid half-ester of the above Formula I, by reacting thiamphenicol succinic acid half-ester of the Formula II with a basic amino acid, as shown in the following scheme:

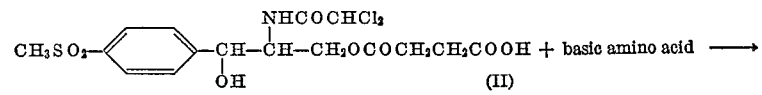

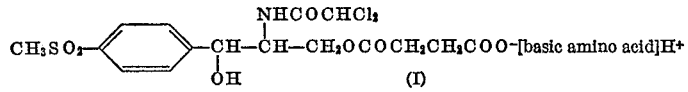

Thiamphenicol is one of the excellent antibacterials as well as chloramphenicol. However, chloramphenicol cannot be used for the urinary tract infection as it is excreted into urine inactivated as glucuronide form. On the contrary, thiamphenicol is one of the most excellent antibacterials for the control of the urinary tract infection in many systemic infections because it is excreted into urine as an active form.

However, thiamphenicol cannot be used for injection because of its slight solubility in water. For this reason, extensive research on water-soluble thiamphenicol derivatives has hitherto been made, but these are not in practical use except glycinate hydrochloride.

As the results of the experiments on the water-soluble thiamphenicol derivatives, the present inventors have found that basic amino acid salts of thiamphenicol succinic acid half-ester have characteristics of excellent solubility and give a neutral aqueous solution and are of very low toxicity and give neither topical irritation nor necrosis upon injection and exhibit high blood level and are excreted into urine to a great extent as an active form after injection.

These data are illustrated in the following tables.

Since all basic amino acid salts of thiamphenicol succinic acid half-ester of this invention have almost the same biological properties, only the arginine salt will be described hereinafter as a representative example.

Arginine salt of thiamphenicol succinic acid half-ester (abbreviated as TPS·A hereinafter) is readily soluble in water as 40 percent equivalent to thiamphenicol (TP) and the resulting aqueous solution is neutral and stable, though thiamphenicol glycinate hydrochloride (referred to as TPG·HCl) is unstable and inclined to acidic in aqueous solution (Table I). The acute toxicity of TPS·A is much lower than TPG·HCl, TP, chloramphenicol (referred to as CP) and sodium salt of chloramphenicol succinic acid half-ester (referred to as CPS·Na) as shown in Table II.

When injected intradermally, TPS·A is found to be almost non-irritative by the method of determining an increase in capillary permeability using Trypan Blue. An increase in capillary permeability by the injection of TPS·A is not only very little as compared with that of CPS·Na or TPG·HCl, but is substantially same as saline solution (Table III).

Furthermore, TPS·A does not cause necrosis in the injected lesion in contrast to TPG·HCl or CPS·Na, when given subcutaneously to mice as shown in Table IV. Blood level of TPS·A is remarkably higher than that of arginine salt of chloramphenicol succinic acid half-ester (referred to as CPS·A) in both rat and dog (Tables V and VI).

Urinary excretion rate in biologically active form of TPS·A is very much higher than that of CPS·Na and almost comparable with that of TPG·HCl as shown in Table VII.

Judging comprehensively from the results illustrated above concerning solubility, pH value of the solution, toxicity, topical irritability, blood level and urinary excretion rate, it is obvious that TPS·A is the most excellent compound for an injection among hitherto known thiamphenicol or chloramphenicol derivatives.

TABLE I pH value of TPS·A solution 40 percent aqueous solution as thiamphenicol

| Compound: | pH after 30 minutes |
|---|---|
| TPS·A | 7.0 |
| TPG·HCl | 3.0 |
| CPS·Na | 6.0 |

TABLE II

Acute toxicity of TPS·A animal: mice (ICR ♂), five in each group.
administration: intravenously.

| Compound: | LD$_{50}$ (mg./kg.) |
|---|---|
| TPS·A | >3000 |
| TPG·HCl | 245 |
| TP | 368 |
| CP | 245 |
| CPS·Na | 1000–3000 |

TABLE III

Local irritation by TPS·A

Method: 0.5 ml. of 40% solution of TPS·A or other derivatives equivalent to TP or CP is injected intradermally to a back skin of rabbit (♂) and then 1% Trypan Blue solution is injected intravenously and the amount of the dye deposited in the injected lesion is determined colorimetrically.

| Compound: | Dye recovered (μg.) |
|---|---|
| Saline | 4.5 |
| TPS·A | 6.1 |
| TPG·HCl | 11.5 |
| CPS·Na | 11.2 |

TABLE IV

Necrotizing effect of TPS·A animal: mice (ICR ♂), four in each group.
administration: 0.1 ml. of 40% solution of each compound equivalent to TP or CP, subcutaneously in back.
observation: incidence rate of necrosis after 2 days.

| Compound: | Incidence rate of necrosis percent |
|---|---|
| TPS·A | 0 |
| TPS·HCl | 100 |
| CPS·Na | 50 |

TABLE V.—BLOOD LEVEL OF TPS·A

Animal: Rat (Wistar ♂) three in each group
Administration: 50 mg./kg., subcutaneously
Measurement: Bioassay value by the superposition method using *Streptococcus hemolyticus*

| | Blood level (μg./ml.) | |
|---|---|---|
| Compound | TPS·A | CPS·A |
| Hrs. after administration: | | |
| 0.5 | 26.3 | 16.1 |
| 1 | 27.7 | 11.0 |
| 1.5 | 23.5 | 7.0 |
| 2 | 16.7 | 4.9 |
| 3 | 7.0 | 1.4 |
| 5 | 0 | 0 |

TABLE VI.—BLOOD LEVEL OF TPS·A

Animal: Dog (Beagle ♀), cross-overed, with two
Administration: 50 mg./kg., intramuscularly
Measurement: The same as in Table V

| | Blood level (μg./ml.) | |
|---|---|---|
| Compound | TPS·A | CPS·A |
| Hrs. after administration: | | |
| 0.5 | 26.3 | 16.0 |
| 1 | 26.8 | 18.9 |
| 1.5 | 22.3 | 16.4 |
| 2 | 19.0 | 13.4 |
| 2.5 | 15.9 | 11.3 |
| 3.5 | 11.5 | 6.9 |
| 5 | 6.2 | <2.8 |
| 7 | 3.6 | <2.5 |

TABLE VII

Urinary excretion of TPS·A animal: rat (Wister ♂), two to four in each group.
administration: 100 mg./kg., subcutaneously.
measurement: bioassay value by the plate diffusion method using *Staph. aureus* 209p.

| Compound: | Cumulative urinary exretion rate to 24 hours after administration percent |
|---|---|
| TPS·A | 53.3 |
| CPS·Na | 4.0 |
| TPG·HCl | 56.9 |

Thiamphenicol succinic acid half-ester of the Formula II which is used as the starting material in this invention can be obtained by reacting thiamphenicol (III) with succinic anhydride (IV).

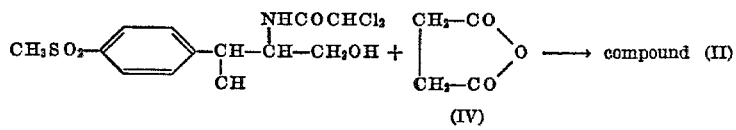

As the medium for the reaction of thiamphenicol (III) with succinic anhydride, a usual organic solvent which does not take part in the reaction may be used in an anhydrous state. The reaction proceeds especially advantageously when an ether type solvent such as dioxane or tetrahydrofuran is used. The reaction is carried out at an arbitrary temperature of between room temperature and the boiling point of the solvent employed. The reaction time depends on the reaction temperature between 75 to 80° C.

This invention provides a method for producing the basic amino acid salt (I) by allowing thiamphenicol succinic acid half-ester (II) to react with a basic amino acid to form a salt, and thereafter removing the solvent. Thiamphenicol succinic acid half-ester (II) itself is a substance slightly soluble in water, but is soluble at room temperature under stirring in an aqueous solution of a basic amino acid to form its salt.

The most suitable molar ratio between the thiamphenicol succinic acid half-ester (II) and the basic amino-acid in this reaction is equimolar in consideration of the effect exerted on the isolation step of the product after the reaction. The reaction satisfactorily proceeds even at room temperature and comes to an end with complete dissolution of the thiamphenicol succinic acid half-ester (II) into the basic amino acid solution. After the completion of the reaction, the solvent is preferably distilled out under reduced pressure, but by freeze-drying the product can be obtained in a more preferred state. The resulting product can be recrystallized from a proper solvent as required.

Among the compounds to be obtained according to the method of this invention are salts of arginine, lysine, ornithine, histidine and tryptophan of thiamphenicol succinic acid half-ester, all of which exhibit a high antibacterial activity in vivo.

The novel compounds of this invention can be used in the form of a solution by dissolving the same in a pharmaceutically acceptable carrier or diluent such as sterilized distilled water or sterilized saline solution. Since these compounds are very low in toxicity as explained hereinbefore, a large amount thereof can be administered according to the condition of patient. In general, however, 0.5 to 2 g. (as thiamphenicol) per day may be administered in the form of a solution with a concentration of 5 to 50% by weight.

For the purpose of illustration only, this invention will be described in the following examples. It should be understood that this invention is not to be limited thereto or thereby.

EXAMPLE 1

In a solvent mixture consisting of 30 ml. dioxane and 15 ml. pyridine, 7.1 mg. of thiamphenicol and 2.0 g. of succinic anhydride were dissolved, and were reacted at 75 to 80° C. for 4.5 hours under stirring. Upon termination of the reaction, the solvent was removed under a reduced pressure, and 50 ml. of water was added. The resulting solution was neutralized with hydrochloric acid under stirring, then crystals separated out gradually (yield 6.3 g.). The crude crystals of thiamphenicol succinic acid half-ester were recrystallized from ethyl acetate. The melting point was 147–148° C.

*Elementary analysis.*—Calcd. as $C_{16}H_{19}O_8NCl_2S$ (percent): C, 42.11; H, 4.20; N, 3.07; Cl, 15.54; S, 7.03. Found (percent): C, 42.25; H, 4.29; N, 3.01; Cl, 15.31; S, 6.94.

EXAMPLE 2

In 10 ml. of water, 0.17 g. of arginine was dissolved. To this solution, 0.456 g. of thiamphenicol succinic acid half-ester was added, which dissolved after 10 minutes of stirring at room temperature. After removing a slight amount of undissolved matter, the solution was freeze-dried to obtain 0.615 g. of arginine salt of thiamphenicol succinic acid half-ester as a white powdered form. The melting point was 132–136° C. (decomposed).

*Elementary analysis.*—Calcd. as $C_{22}H_{33}O_{10}N_5Cl_2S$ (percent): C, 41.91; H, 4.27; N, 11.11; Cl, 11.25; S, 5.09. Found (percent): C, 41.81; H, 5.40; N, 11.38; Cl, 11.09; S, 5.02.

EXAMPLE 3

To a suspension of 0.456 g. of thiamphenicol succinic acid half-ester in 10 ml. of water was added 0.146 g. of L-lysine with stirring at room temperature. A clear solution was obtained after 10 minutes. After a slight amount of insoluble matter was removed by filtration, the resulting solution was concentrated in vacuo to dryness. By triturating the residue with dioxane, L-lysine salt of thiamphenicol succinic acid half-ester was obtained as white crystals. Yield 0.55 g. Melting point 113–117° C. (decomposed).

*Elementary analysis.*—Calcd. as $C_{22}H_{33}O_{10}N_3Cl_2S$ (percent): C, 43.86; H, 5.52; N, 6.97; Cl, 11.77; S, 5.32. Found (percent): C, 43.95; H, 5.43; N, 6.88; Cl, 11.51; S, 5.19.

EXAMPLE 4

A mixture of 0.456 g. of thiamphenicol succinic acid half-ester and 0.132 g. of L-ornithine in 10 ml. of water was stirred at room temperature for 10 minutes. After a slight amount of insoluble matter was removed by filtration, the resulting clear solution was concentrated in vacuo to dryness. By triturating the residue with tetrahydrofurane, L-ornithine salt of thiamphenicol succinic acid half-ester was obtained as white crystals. Yield 0.52 g. Melting point 105–110° C. (decomposed).

*Elementary analysis.*—Calcd. as $C_{21}H_{31}O_{10}N_3Cl_2S$ (percent): C, 42.86; H, 5.31; N, 7.14; Cl, 12.05; S, 5.45. Found (percent): C, 42.93; H, 5.21; N, 7.05; Cl, 12.17; S, 5.33.

What we claim is:
1. A compound of the formula

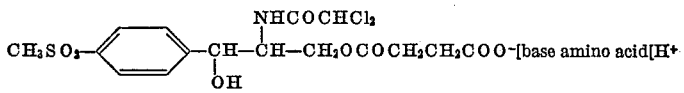

wherein the basic amino acid is arginine, lysine, ornithine, histidine or tryptophan.

2. A compound according to claim 1 wherein the basic amino acid is arginine.

References Cited
UNITED STATES PATENTS

| | | | |
|---|---|---|---|
| 3,607,911 | 9/1971 | Ikezuki et al. | 260—485 G |
| 2,988,481 | 6/1961 | Gregory | 260—485 G |

LORRAINE A. WEINBERGER, Primary Examiner

E. J. SKELLY, Assistant Examiner

U.S. Cl X.R.

260—309, 326.14 T; 424—273, 274, 313